(No Model.)

H. R. RANDALL.
MANUFACTURE OF FIBER FROM FIBER PLANTS.

No. 342,843. Patented June 1, 1886.

Witnesses:
E. F. Tourtellotte.
Charles MacInnes.

Inventor
Henry R. Randall
By James A. Whitney
Attorney.

UNITED STATES PATENT OFFICE.

HENRY R. RANDALL, OF BROOKLYN, NEW YORK.

MANUFACTURE OF FIBER FROM FIBER-PLANTS.

SPECIFICATION forming part of Letters Patent No. 342,843, dated June 1, 1886.

Application filed November 11, 1885. Serial No. 182,465. (No model.)

*To all whom it may concern:*

Be it known that I, HENRY R. RANDALL, of Brooklyn, in the county of Kings and State of New York, have invented certain Improvements in the Manufacture of Fiber from Fiber-Plants, of which the following is a specification.

This invention relates to the preparation for textile purposes of flax, hemp, ramie, and other fiber-producing plants.

As concerns flax, hemp, &c., usually subjected to what is technically termed "retting," the latter impairs the strength of the fiber, discolors it with the products of incipient decay, and thereby not only renders it extremely difficult to bleach to the requisite degree, but, because of the strong chemical agents requisite to bleach it approximately to the extent necessary, weakens the fiber and involves great expenditure of time and money. Further, the severity of the treatment to which the fiber is thus subjected renders it harsh without insuring the complete removal of gum and resinous matters, and those objectionable features of the product interfere with its subsequent economical manufacture into yarns and fabrics.

As concerns ramie, it is commonly treated by crushing and breaking—as, for example, by passing the stalks between rollers plain or grooved, and by subsequently hatchelling in much the same manner or flax. This not only requires expensive machinery and the expenditure of much time, but fails to remove the gum or resinous matter, and although it has been attempted to remove the said gum or resinous matter by boiling the crushed stalks in alkaline solutions the desired results have been but imperfectly realized; and, further, the boiling of the crude or merely mechanically-crushed stalks with alkali constitutes a long and expensive operation, and the strength of the alkali required to produce an appreciable result greatly weakens the fiber.

My invention relates to the production of fiber from flax, hemp, and other fibrous or fiber-producing material usually retted, as aforesaid, and also to the production of fiber from ramie and other fibrous or fiber-producing material with which the retting is substituted by crushing, breaking, hatchelling, &c., as aforesaid; and its object is to produce a soft clean fiber, free from gum and impurities, and with practically the whole of its original strength, at a greatly reduced expense of time, labor, and money, and it comprises certain novel means, hereinafter fully set forth and specified, whereby said advantageous results are effectually secured.

Figure 1:
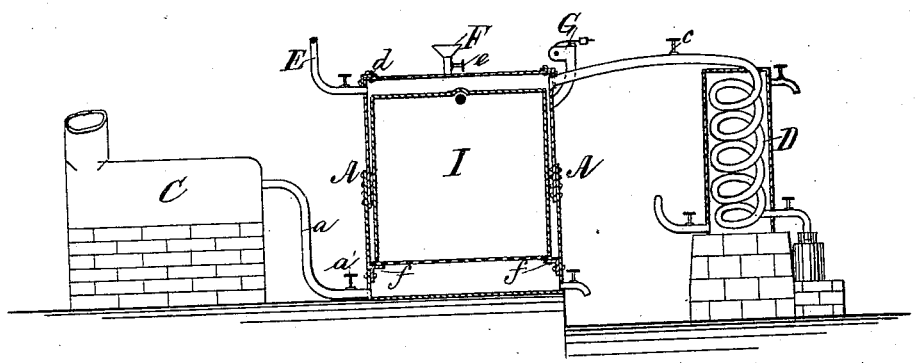
Figure 2:
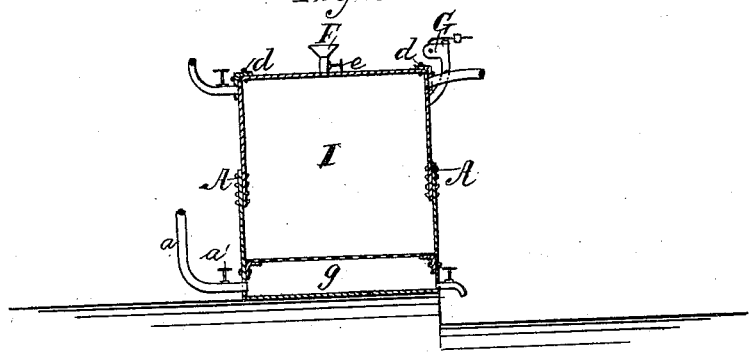

In the accompanying drawings, Figure 1 is a longitudial vertical sectional view of an apparatus which may be used in carrying my said invention into practice. Fig. 2 is a similar view representing a modification in one feature of said apparatus.

In the practice of my said invention I provide a closed tank or receptacle, and a condenser connected therewith, and a steam-inlet leading to said tank. I place the crude fibrous or fiber-bearing material, whether flax, hemp, ramie, or other material in the tank with preferably a small quantity of water at the bottom of the tank. I also place in said tank with said material a suitable quantity of bisulphide of carbon—as, for example, six quarts of naphtha for five hundred pounds of the fiber material to be treated. Preferably, however, I combine with the bisulphide of carbon any desired quantity of naphtha or equivalent liquid hydrocarbon, as I find that by this means a much more rapid and satisfactory action upon the fiber-bearing material is obtained. The material and the solvent—*i. e.*, the hydrocarbon or the hydrocarbon combined with bisulphide of carbon, as aforesaid—being inclosed within the tank and the latter closed, steam is admitted in quantity and at a temperature sufficient to raise the temperature within the tank to, say, 150° Fahrenheit, more or less, and the contents of the tank are maintained at this temperature for, say, one hour, more or less, the communication with the condenser being meanwhile kept closed. The action of the steam is to bring the solvent to a vaporized condition, in which it permeates the material more generally than in its liquid form. The steam at the temperature above indicated is reduced to the form of aqueous vapor and in some measure assists the liberation of the fibers from the woody substance by dividing such cementing substances as are insoluble in the hydrocarbon solvent. After the treatment with vapor has proceeded to the requisite extent, communication is opened with the condenser, and the vapors, hydrocarbon and others, are withdrawn by condensation through the condenser. This done, the outlet to the condenser should be closed and an alkaline solution—preferably a solution of bicarbonate of soda, at from 2° to 4° Beaumé—is run into the tank and maintained at a substantially boiling temperature by the admission of steam, or otherwise, say, from thirty minutes to an hour; but this period may be varied according to the character of the material under treatment, the more tender and delicate the original fiber the less the time required. The alkaline solution is then drawn off, and is replaced by water, which is kept preferably at a boiling temperature until the traces of alkali are substantially removed, which done the water is drawn off and a further quantity of water is preferably passed through the tank to rinse the material. The material being removed from the tank and dried by any suitable means, the fibers are substantially separated from the woody material, and the final removal of the latter may be obtained by any suitable mechanical means—as, for example, those usual in the reduction to fiber to retted flax. The hydrocarbon softens the gum and fits it for the more effective action of the chemical agent subsequently applied. The alkali dissolves and removes the gum and insures the separation of the fibers, and the subsequent boiling with water removes the alkali, which, if suffered to remain, would in course of time impair the integrity of the fiber. By the means described, therefore, I obtain a loose, soft, and clean fiber without impairing to any appreciable degree the original strength of the fiber as it existed in the fiber-bearing plant or material.

Any suitable apparatus may be employed for carrying into effect my said invention, but that represented in the accompanying drawings is preferred.

A is the tank.

C is a steam-boiler connected with the tank by steam-pipe $a$, having cock $a'$, and broadened to admit steam to the tank to vaporize the hydrocarbon and to boil the alkali, as hereinbefore explained, and by hot-water pipe $b$, having cock $b'$, to admit the hot water to the tank when required.

D is the condenser, which may be of the same construction as the condenser of an ordinary still, and is provided with a cock, $c$, by which communication between the tank and condenser may be closed or opened.

E is an inlet-pipe having a cock, $d$, and through which water may be introduced to the tank, the water being brought to the boiling temperature, when required, by the admission of steam to the tank.

F is a funnel-inlet, provided with a cock, $e$, and through which the solvent or liquid hydrocarbon and the alkaline solution may be introduced, and G is a safety-valve to prevent danger of explosion from the accumulation of pressure within the tank.

As shown in Fig. 1, the tank is provided with an internal cage or basket, foraminated at its bottom or sides, or both, and resting on brackets or supports $f$ at some little space above the bottom of the tank. By means of said cage or basket the material may be more conveniently removed from the tank. When such cage or basket is dispensed with, the tank should be provided with a foraminated false bottom, $g$, as shown in Fig. 2.

For the purposes of this identical application I do not claim the said apparatus, for the reason that I claim the several substantial and different features thereof in my separate and distinct application for Letters Patent of the United States, filed, or to be filed, of even date with this.

What I claim as my invention is—

1. The process of preparing fibrous or textile material for the separation of its fibers from the woody substance by subjecting the material to the action of bisulphide of carbon, substantially as and for the purpose herein set forth.

2. The process of preparing fibrous material for the separation of its fibers from the woody substance by subjecting the material to the action of a confined atmosphere of vaporized bisulphide of carbon, substantially as and for the purpose herein set forth.

3. The process of preparing fibrous material for the separation of its fibers from the woody substance by subjecting the material to the action of confined bisulphide of carbon and steam or aqueous vapor, substantially as and for the purpose herein set forth.

4. The process of preparing fibrous material for the separation of its fibers by treatment with confined vaporized bisulphide of carbon, steam, or aqueous vapor and alkali, substantially as and for the purpose herein set forth.

5. The process of preparing fibrous material for the separation of its fibers by successive treatment with vaporized confined bisulphide of carbon, steam, or aqueous vapor, alkali, and water, substantially as and for the purpose herein set forth.

6. The process of preparing fibrous material for the separation of its fibers by subjecting the material in a closed tank to the action of a solvent vapor or vapors, substantially as and for the purpose herein set forth.

HENRY R. RANDALL.

Witnesses:
JOHN G. HONEY,
CHAS. MACINNES.